United States Patent
Gunnarsson et al.

(10) Patent No.: US 8,805,271 B2
(45) Date of Patent: Aug. 12, 2014

(54) SYSTEM AND METHOD FOR CONFIGURING A REPEATER

(75) Inventors: Fredrik Gunnarsson, Linköping (SE); Pål Frenger, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 311 days.

(21) Appl. No.: 13/238,509

(22) Filed: Sep. 21, 2011

(65) Prior Publication Data

US 2013/0072110 A1 Mar. 21, 2013

(51) Int. Cl.
*H04B 7/14* (2006.01)
*H04B 7/26* (2006.01)
*H04W 72/04* (2009.01)
*H04W 12/00* (2009.01)
*H04W 12/06* (2009.01)
*H04W 84/08* (2009.01)

(52) U.S. Cl.
CPC ......... *H04B 7/2606* (2013.01); *H04W 72/0466* (2013.01); *H04W 12/00* (2013.01); *H04W 12/06* (2013.01); *H04W 84/08* (2013.01)
USPC .............. 455/7; 455/11.1; 455/13.1; 370/315

(58) Field of Classification Search
CPC ...... H04B 17/02; H04B 1/60; H04B 7/15542; H04B 7/15535; H04W 52/46; H04W 88/04; H04W 48/08; H04W 84/0477
USPC ............. 455/7, 13.1, 41.2, 9, 411, 11.1, 67.3, 455/16, 450; 370/315, 342, 395.3, 501, 370/492, 75, 97, 328, 252, 436, 203
See application file for complete search history.

(56) References Cited

U.S. PATENT DOCUMENTS

| | | | | |
|---|---|---|---|---|
| 6,480,558 | B1 * | 11/2002 | Ottosson et al. | 375/350 |
| 7,142,526 | B1 * | 11/2006 | Hokao | 370/331 |
| 8,064,412 | B2 * | 11/2011 | Petite | 370/338 |
| 8,543,872 | B2 * | 9/2013 | Kreuchauf et al. | 714/704 |
| 2002/0115464 | A1 * | 8/2002 | Hwang et al. | 455/522 |
| 2002/0172184 | A1 * | 11/2002 | Kim et al. | 370/344 |
| 2006/0115015 | A1 * | 6/2006 | Oh et al. | 375/267 |
| 2006/0184862 | A1 * | 8/2006 | Kim et al. | 714/784 |
| 2007/0104085 | A1 * | 5/2007 | Sambhwani et al. | 370/203 |
| 2011/0044456 | A1 * | 2/2011 | Edholm et al. | 380/287 |
| 2012/0192020 | A1 * | 7/2012 | Kreuchauf et al. | 714/704 |
| 2013/0028122 | A1 * | 1/2013 | Ma et al. | 370/252 |

OTHER PUBLICATIONS

U.S. Appl. No. 13/238,597, filed Sep. 21, 2011, Fredrik Gunnarsson.
U.S. Appl. No. 13/238,769, filed Sep. 21, 2011, Fredrik Gunnarsson.

(Continued)

*Primary Examiner* — Tan Trinh

(57) ABSTRACT

A method of configuring a repeater in a mobile communication network includes receiving information identifying a first set of scrambling codes from a repeater. The first set of scrambling codes includes one or more scrambling codes that are being used by base stations from which the repeater has received signals. The method also includes determining a set of one or more unavailable scrambling codes based on the first set and selecting a scrambling code for the repeater based on the set of unavailable scrambling codes. Additionally, the method includes transmitting information identifying the selected scrambling code to the repeater.

15 Claims, 6 Drawing Sheets

(56) References Cited

OTHER PUBLICATIONS

3GPP. 3rd Generation Partnership Project: Technical Specification Group Core Network and Terminals; Non-Access-Stratum (NAS) Protocol for Evolved Packet System (EPS); Stage 3 (Release 10). 3GPP TS 24.301 V10.3.0 (Jun. 2011).

3GPP. 3rd Generation Partnership Project; Technical Specification Group Radio Access Network; Radio Resource Control (RRC): Protocol Specification (Release 10). 3GPP TS 25.331 V10.4.0 (Jun. 2011).

3GPP. 3rd Generation Partnership Project; Technical Specification Group Radio Access Network; UTRAN Function, Examples on Signalling Procedures (Release 10). 3GPP TR 25.931 V10.1.0 (Jun. 2011).

\* cited by examiner

SYSTEM AND METHOD FOR CONFIGURING A REPEATER

TECHNICAL FIELD OF THE INVENTION

This disclosure relates in general to wireless communication and, more particularly, to a repeater for facilitating communication between a mobile terminal and a radio access network.

BACKGROUND OF THE INVENTION

The dramatic increase in the use and availability of communication services in recent years has led to a significant increase in the need for mobile broadband services. A primary goal of mobile broadband is to offer seamless wireless communications services essentially everywhere. Macro cell deployments often provide acceptable service coverage, and some areas such as important or highly-populated buildings are served by dedicated solutions. However, in other areas, macro coverage is insufficient, and it is not economically viable to consider dedicated deployments. Examples include underground garages, tunnels, and apartment buildings.

One possible solution in such cases is to deploy repeaters. A repeater receives radio signals and forwards the received signal towards its intended destination, possibly after some amplification. In some networks, a repeater (amplifies and) forwards both signals and noise received by the repeater. That is, all signals received by the repeater are repeated—no knowledge about the communication protocols is needed. Additionally, in some cases the repeater may be capable of operating so that a donor cell and/or base station serving the repeater are unaware that the device they are directly communicating with is a repeater.

Nonetheless, because repeaters may transmit and receive wireless signals in areas in which base stations or other radio access elements are also communicating with mobile terminals, repeaters may need to be carefully configured to permit them to successfully interoperate with these other devices. However, an advanced communication system may include numerous repeaters positioned in a widely distributed geographic area. Furthermore, installation and operation of repeaters may be carried out by different parties than those operating the other elements of the radio access network, making it difficult to know when and where a repeater will be activated and need configuration. Additionally, the optimal configuration of a repeater may depend heavily on the other devices operating in its vicinity or other aspects of its current operational environment. As a result, the development of techniques for the automated configuration of repeaters in advanced communication networks is highly desirable.

SUMMARY OF THE INVENTION

In accordance with the present disclosure, certain disadvantages and problems associated with mobile communication have been substantially reduced or eliminated. In particular, certain devices and techniques for repeating wireless transmissions are described.

In accordance with a particular embodiment of the present disclosure, a method for configuring a repeater in a mobile communication network includes receiving information identifying a first set of scrambling codes from a repeater. The first set of scrambling codes includes one or more scrambling codes that are being used by base stations from which the repeater has received signals. The method also includes determining a set of one or more unavailable scrambling codes based on the first set and selecting a scrambling code for the repeater based on the set of unavailable scrambling codes. Additionally, the method includes transmitting information identifying the selected scrambling code to the repeater.

In accordance with another embodiment of the present invention, a method of operating a wireless repeater in a communication system includes receiving, at a repeater, one or more pilot signals transmitted by base stations. The method also includes determining a scrambling code used by one or more of the base stations based on respective pilot signals received from these base stations and transmitting information identifying a first set of scrambling codes to a radio controller. The first set includes scrambling codes used by at least a portion of the base stations. The method also includes receiving information identifying an assigned scrambling code from the radio controller and transmitting a repeater pilot signal using the assigned scrambling code.

Important technical advantages of certain embodiments of the present invention include techniques for configuring a repeater based on information collected by the repeater from a radio access network serving the repeater. Particular embodiments may permit rapid configuration and activation of newly-deployed repeaters in areas with a high concentration of other repeaters and base stations. Additionally, particular embodiments may permit dynamic re-configuration of the repeater as operating conditions in the vicinity of the repeater, including the number of other devices operating in the area, change. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
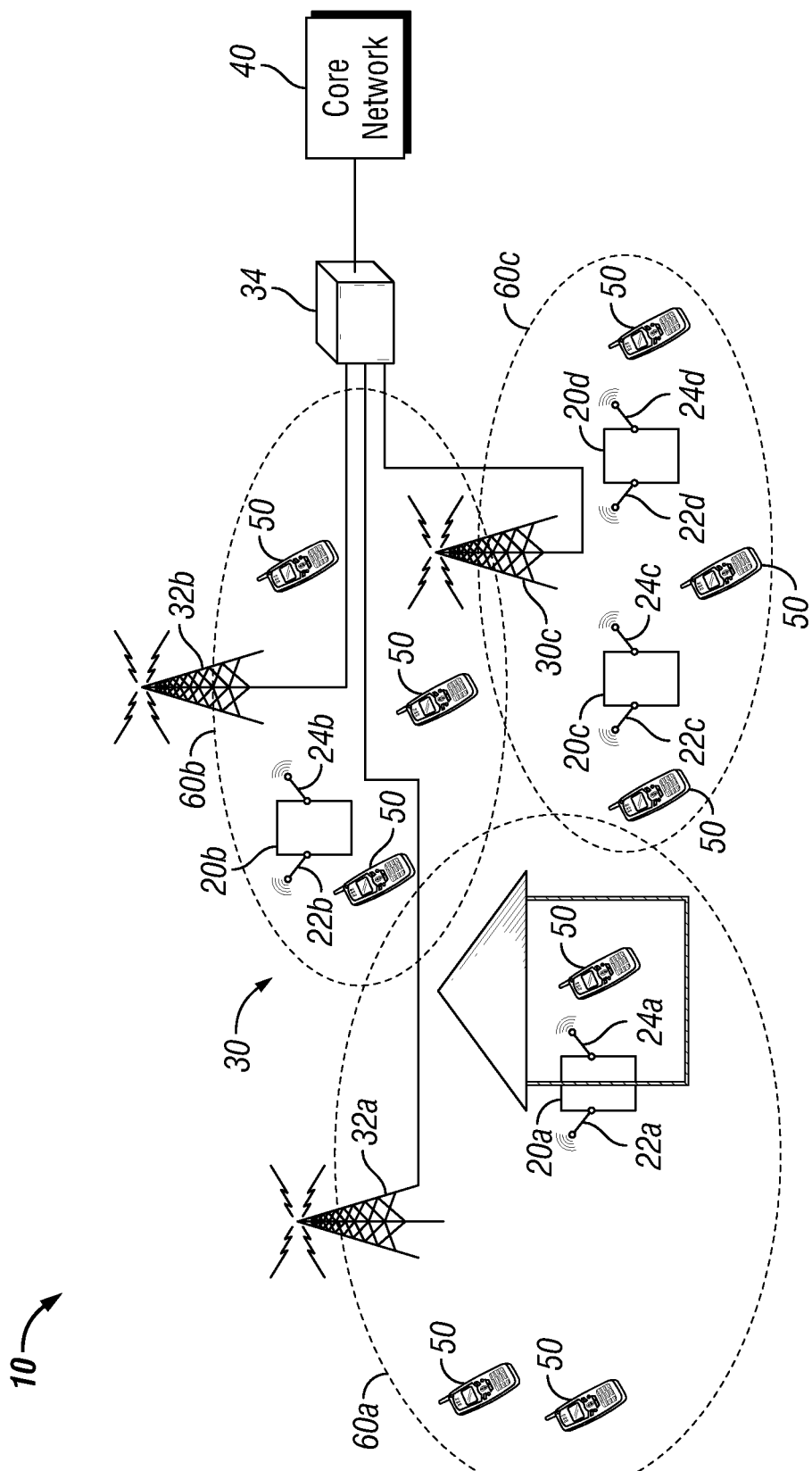
FIG. 1 illustrates a mobile communication system that includes a repeater capable of repeating transmissions received from mobile devices for transmission to an access network of the mobile communication system.

FIG. 1 illustrates a mobile communication system 10 that provides communication service to a plurality of mobile devices 50. Mobile communication system 10 includes an access network 30 that provides communication services to a plurality of cells 60 associated with mobile communication system 10 and a core network 40 that provides backhaul delivery of information within mobile communication system 10. To increase the coverage and/or capacity of access network 30, mobile communication system 10 also contains one or more repeaters 20 that repeat radiofrequency signals received from mobile devices 50.

To permit repeaters 20 to operate within the same geographic area as access network 30 and/or other repeaters 20, each repeater 20 may utilize a scrambling code to ensure that signals transmitted by that repeater 20 are distinguishable from those transmitted by other components of mobile communication system 10. By utilizing information collected by a particular repeater 20, mobile communication system 10 can configure that repeater 20 with a unique scrambling code permitting repeaters 20 to serve geographic locations near and even overlapping those served by access network 30. As a result, in particular embodiments, repeater 20 can be easily and automatically configured for operation whenever and wherever they are activated, as explained in further detail below.

In general, mobile communication system 10 provides mobile communication service to mobile devices 50 operating within a geographic area associated with mobile communication system 10. Mobile communication system 10 is capable of communicating information between a mobile device 50 and other mobile devices 50 and/or between a mobile device 50 and other communication devices, such as landline telephones connected to mobile communication system 10. Mobile communication system 10 may support the communication of any suitable type of information in accordance with any appropriate communication standards. For example, mobile communication system 10 may represent a Global System for Mobile Communications (GSM) network, a Wideband Code Division Multiple Access (WCDMA) network, a Long Term Evolution (LTE) communication network, or a network configured to communicate in accordance with any other suitable standard.

Repeaters 20 receive and forward information transmitted wirelessly between mobile devices 50 and access network 30. In certain embodiments, repeaters 20 include multiple antennas, and signals received on one antenna of a repeater 20 are repeated on another antenna. Repeaters 20 may be capable of amplifying received signals based on gains that may be configured for repeaters 20 before or during operation. In particular embodiments, repeaters 20 repeat information transmitted by mobile devices 50, as well as received noise, without decoding the received signals.

Repeaters 20 may represent any appropriate combination of hardware and/or software suitable to provide the described functionality. The contents of an example embodiment of repeater 20 are illustrated in greater below with respect to FIG. 3. In particular embodiments, repeaters 20 may include a terminal module, or otherwise support certain mobile terminal functionality, permitting repeaters 20 to communicate with access network 30 in a similar or identical fashion to that with which mobile devices 50 communicate with access network 30. For example, in particular embodiments, repeaters 20 can establish a signaling connection to an appropriate node of access network 30 (e.g., a radio control node) via Radio Resource Control (RRC) signaling in a similar manner to mobile devices 50.

Access network 30 communicates wirelessly with mobile devices 50 and serves as an interface between mobile devices 50 and core network 40. Access network 30 may represent or include any elements responsible for radio transmissions or for control of radio connections with mobile devices 50. Access network 30 may represent or include a radio access network and/or any elements responsible for providing a radio or air interface for core network 40. For example, in the illustrated embodiment, access network 30 represents a WCDMA access network 30 that includes base stations 32 and radio controllers 34.

Base stations 32 communicate wirelessly with mobile devices 50 to support mobile communication for mobile devices 50. Base stations 32 may include any appropriate elements to communicate with mobile devices 50 and to interface mobile devices 50 with core network 40. For example, depending on the communications standards supported by access network 30 and core network 40, each base station 32 may represent or include a conventional base station, a Node B, an evolved Node B (eNode B), a radio base station (RBS), or any other suitable element capable of communicating with mobile devices 50 wirelessly.

Radio controllers 34 control the operation of base stations 32 and interact with appropriate elements of core network 40. Radio controllers may include any appropriate elements to manage the operation of base stations 32. In particular embodiments, radio controllers 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio controllers 34 may each represent or include a base station controller (BSC), a radio network controller (RNC), or any other suitable collection of hardware and/or software appropriate for controlling base stations 32. Depending on the configuration of a particular embodiment of mobile communication system 10, radio controllers 34 may be omitted from mobile communication system 10, or radio controllers 34 may represent components integrated with, or functionality provided by, based stations 32.

Core network 40 routes voice and/or data communicated by mobile devices 50 from access network 30 to other mobile devices 50 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in particular embodiments of mobile communication system 10, core network 40 may represent a Mobile Application Part (MAP) core network. Additionally, core network 40 may also be responsible for aggregating communication for longhaul transmission, authenticating users, manage user mobility, providing call control, billing, or other functionality associated with providing communication services to mobile devices 50.

Mobile devices 50 provide voice, data, and/or multimedia communication service for users via wireless connections with mobile communication system 10. Mobile devices 50 may represent any appropriate devices capable of wireless communications including, but not limited to, cellular telephones, portable digital assistants (PDAs), laptop or tablet computers, and network-enabled media players. In embodiments of mobile communication system 10 that support 3rd Generation (3G) communication technologies, mobile devices 50 may each represent user equipment (UE).

In operation, mobile communication system 10 provides telecommunication service to mobile devices 50. As part of this service, access network 30 communicates wirelessly with mobile devices 50. For example, in the illustrated embodiment, base stations 32 of access network 30 establish wireless connections with mobile devices 50 for communication over radiofrequency (RF) channels, and radio controllers 34 govern use of available RF channels, manage mobility of mobile devices 50, and otherwise control operation of base stations 32. Meanwhile, core network 40 transports voice, data, multimedia, and/or other types of information between various components of access network 30 and between other elements of mobile communication system 10, such as wireline communication devices.

In order to increase coverage and/or throughput of access network 30, certain cells 60 of mobile communication system 10 also include one or more repeaters 20. Repeaters 20 forward transmissions received from mobile devices 50 to appropriate elements of access network 30 (e.g., base stations 32 in the illustrated embodiment). Repeaters 20 may also be configured to amplify repeated signals to further increase the strength of these signals as received at their intended destination. Because the areas served by repeaters 20 may overlap with those of base stations 32 and/or with other repeaters 20, repeaters 20 may be assigned scrambling codes to enable mobile devices 50 to distinguish the signals of one repeater 20 from other repeaters 20 and base stations 32. Repeaters may use their assigned scrambling codes to encode downlink channels transmitted to mobile devices 50.

However, assigning appropriate scrambling codes to numerous repeaters 20 operating in a wide range of locations within mobile communication system 10 can become difficult. Moreover, the task becomes even more difficult when the network operator cannot predict where and when repeaters 20 will be activated, as may be the case when repeaters 20 are placed and activated by subscribers and not by the network operator. As a result, a flexible, dynamic process for managing the assignment of scrambling codes within mobile communication system 10 is desirable.

Thus, in particular embodiments, a repeater 20 may collect or generate information about the area in which it is operating and communicate this information to a particular node in mobile communication system 10 (e.g., radio controller 34 in FIG. 1) responsible for assigning scrambling codes. The relevant node may then use this information to determine an appropriate scrambling code to assign to that repeater 20. This may enable the node to assign locally unique scrambling codes to each repeater 20 regardless of where in mobile communication system 10 that repeater 20 is located.

For example, in particular embodiments, repeaters 20 support mobile terminal functionality similar or identical to that provided by mobile devices 50. As a result, a particular repeater 20 (assumed, for purposes of this example, to be repeater 20a) may be able to monitor cells 60 served by base stations 32 and other repeaters 20. In doing so, repeater 20a is able to detect scrambling codes used by nearby base stations 32 and repeaters 20. In particular embodiments, repeater 20 does this by attempting to decode a pilot signal (e.g., the signal transmitted on a Common Pilot Channel (CPICH) in certain CDMA embodiments) received from each nearby device using a set of candidate scrambling codes. If the signal produced by decoding the received pilot signal with a particular one of the candidate scrambling codes matches a predetermined chip sequence, repeater 20 determines that the device transmitting the pilot signal is using the relevant candidate code as its scrambling code. Thus, repeater 20 receives one or more pilot signals from nearby radio devices and attempts to decode the pilot signals. More generally, however, repeater 20 may determine the scrambling codes used in the vicinity of repeater 20 in any appropriate manner. Repeater 20 may also perform measurements on signals received from base stations 32 such as a received signal code power (RSCP), Ec/No, path loss.

Additionally, repeater 20a may initiate communication with a detected base station 32 (referred to here as the "donor" base station for repeater 20a) in a similar fashion to that in which mobile devices 50 initiate communication with base stations 32. For example, in particular embodiments, repeater 20a transmits a connection request message (e.g., a Random Access CHannel (RACH) message in certain CDMA embodiments) to the base station 32 from which repeater 20a detects the strongest signal and/or the base station 32 associated with the cell 60 in which repeater 20 detects the best radio conditions.

Once repeater 20a has initiated communication with a base station 32, repeater 20a then communicates the detected scrambling codes, or other information generated based on the detected scrambling codes, to a node responsible for assigning scrambling code to repeaters 20 (in the example of FIG. 1, radio controller 34 serving repeater 20a). Repeater 20a may transmit the actual scrambling codes it detects or any other information suitable to permit radio controller 34 to determine the scrambling codes detected by repeater 20a. Additionally, repeater 20a may indicate all of the scrambling codes detected by repeater 20a or only indicate a subset, such as a predetermined number of the detected scrambling codes or a subset of the detected scrambling codes used by base stations 32 or repeaters 20 satisfying a particular criteria. For example, repeater 20a may transmit to radio controller 34 information indicating scrambling codes for the base stations 32 and/or repeaters 20 associated with the N cells currently providing the most favorable radio conditions for repeater 20a.

In addition to receiving information from repeater 20a indicating the scrambling codes detected by repeater 20a, radio controller 34 may also receive information from other sources that provides additional indications of scrambling codes currently being used in the vicinity of repeater 20a. Radio controller 34 may use neighbor lists maintained for the various base stations 32 managed by radio controller 34 to determine base stations neighboring this donor base station and to identify the scrambling codes used by these neighbors. Additionally, radio controller 34 may receive, from one or more mobile devices 50 that detect repeater 20a, information indicating scrambling codes detected by these mobile devices 50. Radio controller 34 may use such information to determine scrambling codes used in the vicinity of repeater 20a. More generally, radio controller 34 may use any suitable information received from any component of mobile communication system 10 or from any external component to determine scrambling codes used in the vicinity of repeater 20a.

After receiving information indicating the scrambling codes detected by repeater 20a and any other information identifying scrambling codes currently being used in the vicinity of repeater 20a, radio controller 34 may select a scrambling code to assign repeater 20a. In particular embodiments, radio controller 34 generates a set of locally occupied scrambling codes based on the collected information. Radio controller 34 may then select a scrambling code that is not one of the locally occupied scrambling codes. As part of this process, radio controller 34 may identify, from a predetermined group of scrambling codes, a set of locally vacant scrambling codes. This set of locally vacant scrambling codes may represent the remainder of the predetermined group after the locally occupied scrambling codes (and any other scrambling codes that may be unavailable for use by repeater 20a) have been removed. For example, in particular embodiments, mobile communication system 10 utilizes a group of 512 unique scrambling codes, and radio controller 34 selects at random one of these predetermined scrambling codes after the locally occupied scrambling codes have been removed from the group. Furthermore, in particular embodiments, not all scrambling codes utilized in mobile communication system 10 are available for use by repeaters 20, and radio controller 34 may select the assigned scrambling code from a specific set of scrambling codes available for use by repeaters 20.

Once radio controller 34 has selected a scrambling code for repeater 20a, radio controller 34 transmits information identifying the assigned scrambling code to repeater 20a. Repeater 20a may then broadcast its assigned scrambling code in a cell 60 served by repeater 20a or may transmit information scrambled by the assigned scrambling code. For example, in certain CDMA embodiments, repeater 20 may broadcast a Primary Common Pilot CHannel (PCPICH) carrying a predetermined bit sequence scrambled by the assigned scrambling code. Mobile devices 50 that detect the scrambling code may use the detected scrambling code to facilitate communication with repeater 20a. In particular embodiments, mobile devices 50 may use the detected scrambling code to descramble other transmissions by repeater 20a (e.g., other control information transmitted by repeater 20a, such as a Common Control Physical CHannel (CCPCH)). Additionally, in particular embodiments, mobile devices 50 may measure the strength at which they receive the scrambling code and use this measurement, along with similar measurements for other repeaters 20 and base stations 32, in determining an appropriate repeater 20 or base station 32 to communicate with (e.g., as part of a cell selection process) or in estimating certain characteristics of the radio channel between repeater 20a and the relevant mobile device 50. Thus, mobile devices 50 may use the scrambling code transmitted by repeater 20a in one or more ways to facilitate communication with repeater 20a. Accordingly, mobile devices 50 that detect the scrambling code may then begin communicating with repeater 20a. As a result, a mobile device 50 that detects the scrambling code transmitted by repeater 20a may select repeater 20a as its serving cell in a similar fashion to that which mobile devices 50 might select a nearby base station 32 for service. Repeater 20a may then receive signals transmitted by the relevant mobile device 50 and retransmit the received signals (with or without amplification) to its donor base station 32.

In particular embodiments, radio controller 34 may subsequently re-evaluate the initial scrambling code assignment or perform another scrambling code assignment for repeater 20a at a later time instant. For example, in particular embodiments, when a mobile device 50 with a serving base station 32 that is different from the donor base station 32 currently associated with repeater 20a detects and reports the scrambling code of repeater 20a, then radio controller 34 includes the base station 32 serving that mobile device 50 in a set of donor cells for repeater 20a, as described above. In such embodiments, radio controller 34 may be configured to consider the scrambling codes of the all the donor cells for repeater 20a and all the neighbors for these donor cells when compiling the set of locally occupied scrambling codes. If the current scrambling code of repeater 20a is included in the set of occupied scrambling codes, then radio controller 34 may select a new scrambling code from among the new set of vacant scrambling codes and signals the new scrambling code to repeater 20. Repeater 20a may the start broadcasting a pilot signal using this new scrambling code.

Figure 2:
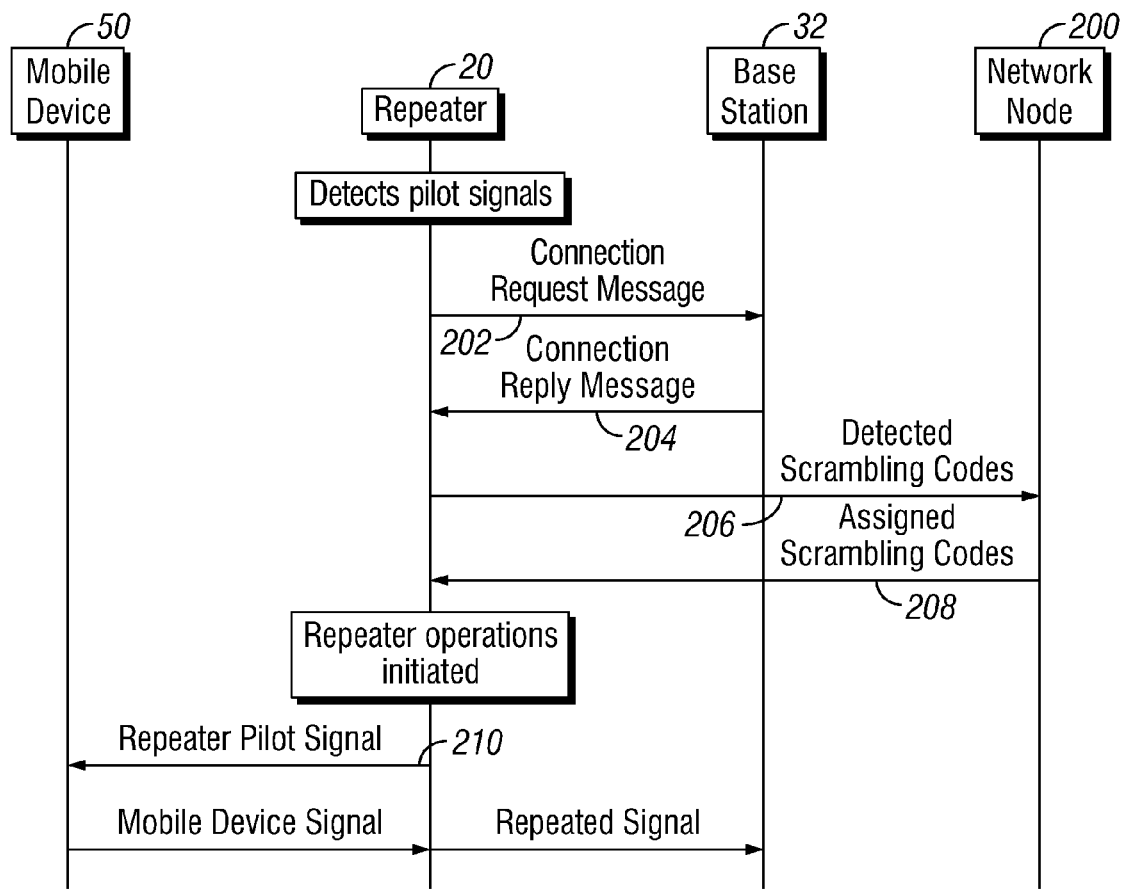
FIG. 2 is a signaling diagram illustrating example signaling between certain elements of the mobile communication system shown in FIG. 1.

FIG. 2 is a signaling diagram showing one example of the interaction that may occur between the various elements in a particular embodiment of mobile communication system 10. Before establishing a radio link with access network 30, repeater 20 detects one or more scrambling codes being used by devices in the vicinity of repeater 20 (including possibly both base stations 32 and other repeaters 20). After receiving and decoding one or more pilot signals from nearby base stations 32, repeater 20 connects to access network 30 through one of the detected base stations 32. In particular embodiments, repeater 20 connects in an identical or similar manner to that of mobile devices 50 served by mobile communication system 10. For example, in the embodiment described by FIG. 2, repeater 20 transmits a connection request message 202 (e.g., a Random Access message in certain CDMA embodiments) to base station 32, requesting establishment of a radio link between repeater 20 and access network 30. In reply to connection request message, base station 32 transmits a connection reply message 204 to repeater 20. Connection reply message 204 indicates successful receipt of connection request message by base station 32.

Once a communication link has been established between repeater 20 and the selected base station 32, repeater 20 transmits a first set 206 of detected scrambling codes to a network node 200 (e.g., a radio controller 34) responsible for assigning scrambling codes to repeaters 20. The relevant network node 200, then determines a set 208 of one or more unavailable scrambling codes in the vicinity of repeater 20 based on this first set and any other suitable information, such as scrambling codes detected by mobile devices 50 operating in the vicinity of repeater 20 or its donor base station 32. Network node 200 then selects a scrambling code to assign to repeater 20 and transmits the assigned scrambling code to repeater 20, as shown in FIG. 2.

After being assigned a scrambling code, repeater 20 begins transmitting a pilot signal 210 using the assigned scrambling code. This enables mobile devices operating in the area served by repeater 20 to detect and initiate communication with, repeater 20. Repeater 20 may then receive and forward (with or without amplification) signals transmitted by mobile devices 50 that detect the pilot signal transmitted by repeater 20a, as shown in FIG. 2.

Figure 3:
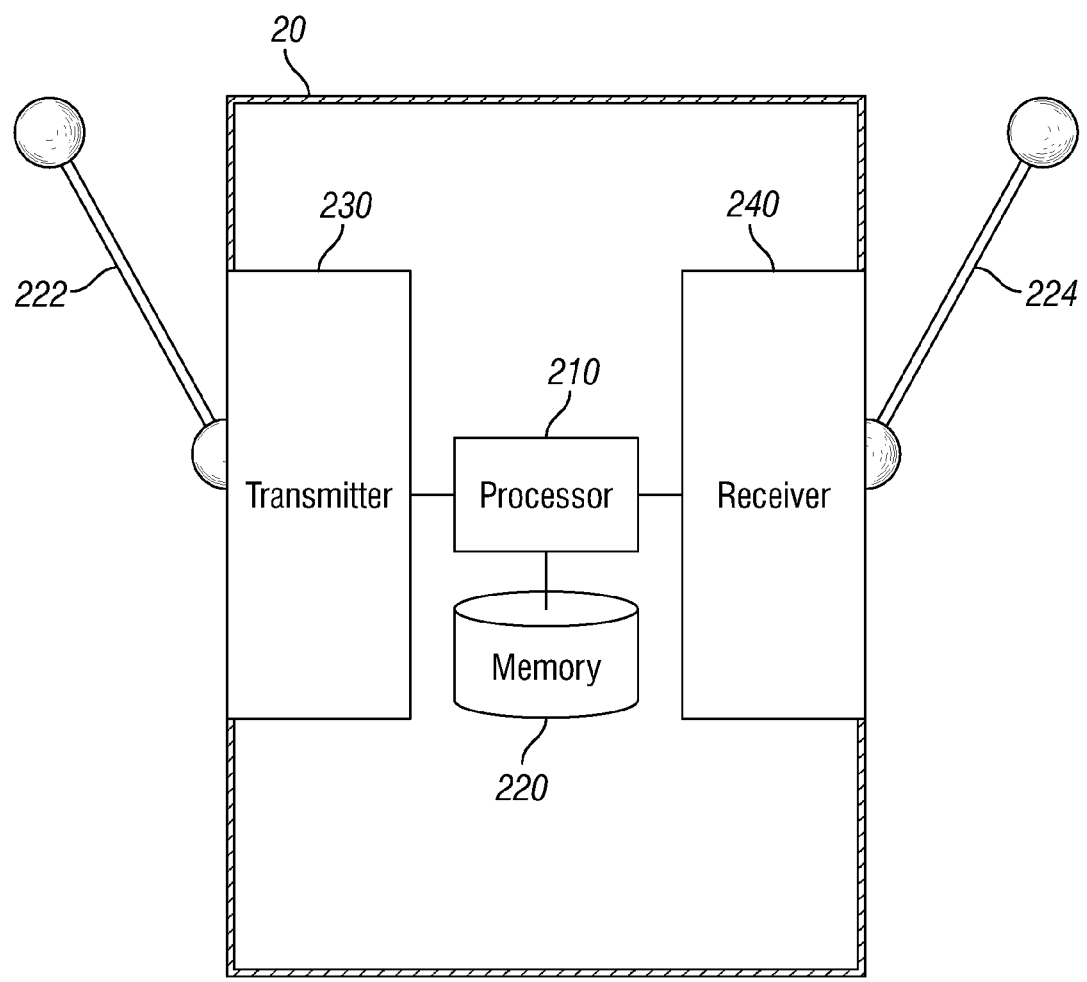
FIG. 3 is a block diagram illustrating an example embodiment of the repeater shown in FIG. 1.

FIG. 3 is a block diagram illustrating in greater detail contents of a particular embodiment of a repeater 20. As shown in FIG. 3, the illustrated embodiment of repeater 20 includes a processor 210, a memory 220, a first antenna 222, a second antenna 224, a transmitter 230, and a receiver 240.

Processor 210 may represent or include any form of electronic circuitry, including dedicated microprocessors, general-purpose computers, or other devices capable of processing electronic information. Examples of processor 210 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of repeater 20 that includes a single processor 210, repeater 20 may include any number of processors 210 configured to interoperate in any appropriate manner. Additionally, although FIG. 3 shows an embodiment in which processor 210 represents a single physical component, processor 210 may, in alternative embodiments, represent any appropriate number of physical components collectively.

Memory 220 stores processor instructions, power values, bit sequences for test signals, and/or any other data utilized by repeater 20 during operation. Memory 220 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, memory 220 may include one or more physical components local to or remote from repeater 20.

First antenna 222 and second antenna 224 represent any suitable conductor capable of receiving and transmitting wireless signals. Transmitter 230 transmits RF signals, including test signals and repeated signals that are being re-transmitted by repeater 20, over first antenna 22. Receiver 240 receives from antenna 24 certain RF signals transmitted by mobile devices 50, repeater 20, and/or other sources. Although the example embodiment in FIG. 3 includes certain numbers of antennas, receivers, and transmitters, alternative embodiments of repeater 20 may include any suitable number of these components. For example, particular embodiments Of repeater 20 may have more than two antennas. Similarly, certain embodiments may include an additional receiver associated with antenna 222 and an additional transmitter associated with antenna 224, or both transmitter 230 and receiver 240 may represent transceivers.

Figure 4:
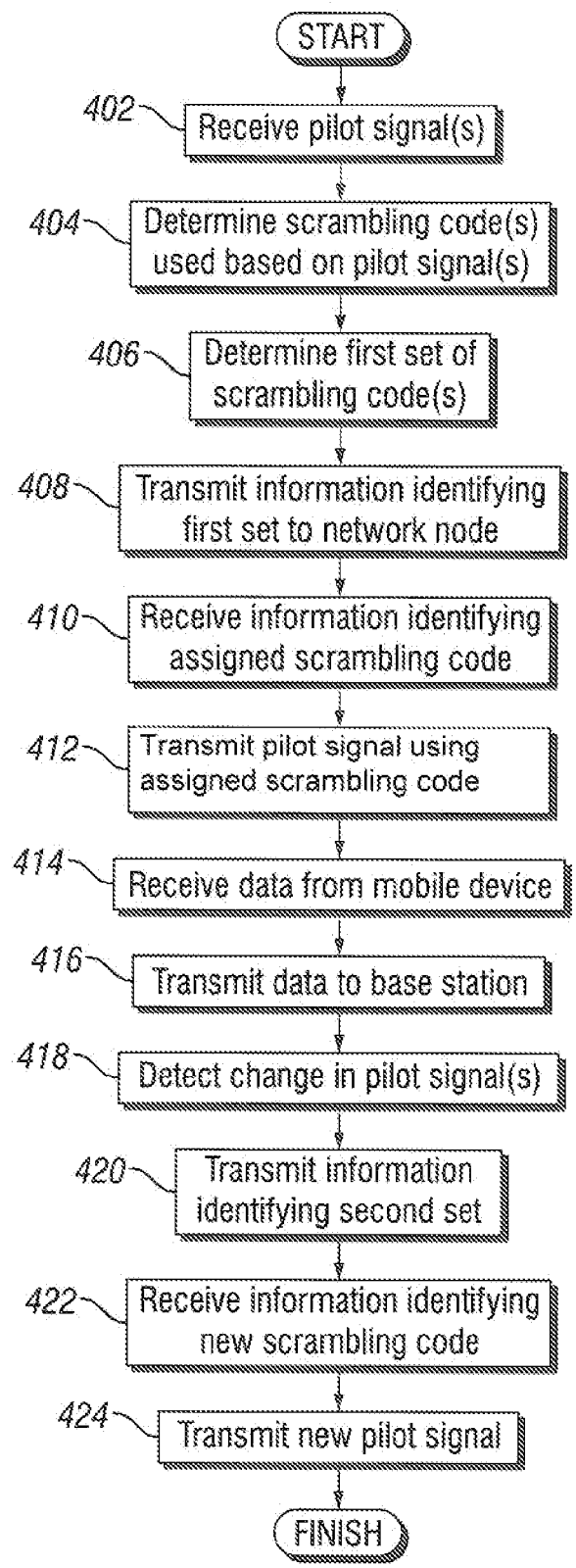
FIG. 4 is a flow chart illustrating example operation of a particular embodiment of the repeater in obtaining and configuring a scrambling code.

FIG. 4 is a flowchart illustrating example operation of a particular embodiment of a repeater 20 in obtaining and configuring a scrambling code. The steps illustrated in FIG. 4 may be combined, modified, or deleted where appropriate. Additional steps may also be added to the example operation. Furthermore, the described steps may be performed in any suitable order.

Operation begins at step 402 with repeater 20a receiving one or more pilot signals transmitted by base stations 32 in the vicinity of repeater 20a. In particular embodiments, the signals each represent a predetermined bit sequence encoded by a specific scrambling code associated with the relevant base station 32. At step 404, repeater 20a determines a scrambling code used by each of the base stations 32 based on the respective pilot signal received from that base station 32. As described above, repeater 20a may determine the scrambling code used by each base station 32 by determining which of a set of candidate scrambling codes repeater 20a is able to successfully decode the corresponding pilot signals with. In particular embodiments, repeater 20a may also receive pilot signals from other repeaters 20 and may similarly determine scrambling codes used by each repeater 20 based on the respective pilot signal received from that repeater 20.

Repeater 20a then determines a first set of scrambling codes to transmit to access network 30 based on the detected scrambling codes at step 406. This first set of scrambling codes may include all of the detected scrambling codes or only a subset of the detected scrambling codes. In particular embodiments, the first set includes only scrambling codes used by a predetermined number of base stations from which the repeater is receiving the strongest signals. At step 408, repeater 20a transmits information identifying the first set of scrambling codes to a network node for use in assigning a scrambling code to repeater 20a. This information may represent the scrambling codes themselves or other information from which the relevant network node can determine the actual scrambling codes.

The network node (in this example, radio controller 34 from FIG. 1) then selects a scrambling code to assign to repeater 20a based on the first set of scrambling codes and transmits the assigned scrambling code to repeater 20a. At step 410, repeater 20a receives information identifying the assigned scrambling code from the radio controller 34. Repeater 20a then transmits a repeater pilot signal using the assigned scrambling code at step 412. As explained above, in particular embodiments, repeater 20a may transmit the pilot signal by using the assigned scrambling code to scramble a predetermined bit sequence and then transmit the scrambled bit sequence on a designated channel (e.g., a PCICH).

In particular embodiments, repeater 20a may then begin forwarding signals received by mobile devices 50 operating in a geographic area associated served by repeater 20a. Thus, after transmitting the repeater pilot signal, repeater 20a receives data transmitted wirelessly by a mobile terminal that has received the pilot signal, at step 414. At step 416, repeater 20a transmits the received data to a base station. In particular embodiments, repeater 20a includes multiple antennas, and repeater 20a may receive data from the mobile terminal 50 on one antenna and transmit the data to base station 32 on another antenna.

In particular embodiments, mobile communication system 10 may be configured to update the scrambling code initially assigned to repeater 20a. Depending on the configuration of mobile communication system 10, this may permit mobile communication system 10 to adjust the scrambling code used by repeater 20a as changes occur in the vicinity of repeater 20a including, for example, other repeaters 20 being activated or radio conditions changing such that new base stations 32 can now be detected or previously-detected base stations 32 can no longer be detected by repeater 20a. In particular embodiments, the update may be triggered by repeater 20a detecting a change in the pilot signals received by repeater 20a. An example of this process is shown by steps 418-424 in FIG. 4. Alternatively, repeater 20a may, in particular embodiments, be configured to periodically report information on received pilot signals regardless of whether repeater 20a has detected a change or to report information on received pilot signals in response to requests from access network 30. Thus, in alternative embodiments, the update may be triggered by radio controller 34 receiving one of these reports or even by radio controller receiving information from other sources (e.g., mobile devices 50 operating in the vicinity of repeater 20a).

At step 418, repeater 20a detects a change in the pilot signals being received by repeater 20a. Depending on the capabilities and configuration of repeater 20a, this change may relate to any particular aspect of the received pilot signals including, without limitation, the devices transmitting pilot signals received by repeater 20a and the absolute or relative strength of the pilot signals received by repeater 20a. As one example, repeater 20a may determine that it is now receiving a pilot signal from a new source, or conversely, that it is no longer receiving a pilot signal from a source that repeater 20a was previously receiving a pilot signal from. For example, such changes may result from the activation or deactivation of new base stations 32 or other repeaters 20 or a change in radio conditions that affect the sources from which repeater 20a can detect pilot signals. As another example, repeater 20a may determine that a particular pilot signal received by repeater 20a no longer satisfies certain criteria or now satisfies criteria it previously did not. For example, in embodiments in which repeater 20a reports scrambling codes associated with the N strongest pilot signals received by repeater 20a, repeater 20a may determine that the relative strengths of the received pilot signals has changed such that the N strongest pilot signals are no longer the same as when repeater 20a initially reported the first set of scrambling codes to radio controller 34.

In response to detecting such changes and/or other changes related to the pilot signals received by repeater 20a, repeater 20a may transmit information identifying a second set of scrambling codes to radio controller 34, as shown at step 420. This second set of scrambling codes reflects the pilot signals currently being received by repeater 20a. Radio controller 34 may then assign a new scrambling code to repeater 20a based on the second set of scrambling codes. Thus, repeater 20a may receive information identifying a new scrambling code from radio controller 34 at step 422. If so, repeater 20a may then begin transmitting a new pilot signal based on the new scrambling code, as shown at step 424.

Figure 5:
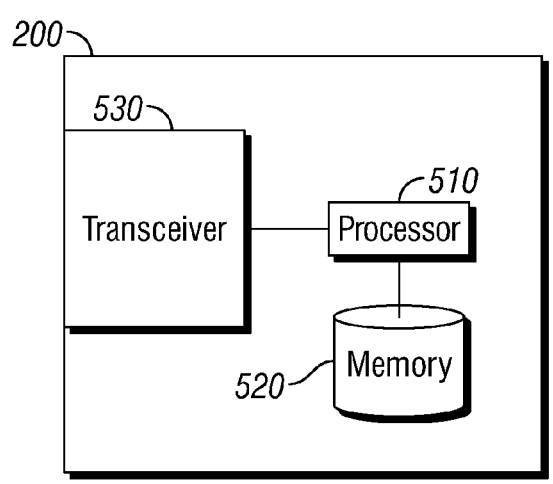
FIG. 5 is a block diagram illustrating an example embodiment of a network node responsible for assigning scrambling codes to the repeater in particular embodiments of the mobile communication system.

FIG. 5 is a structural block diagram showing the contents of a network node 200 that may be responsible for assigning scrambling codes to repeaters 20 in particular embodiments of mobile communication system 10. As explained above, in the example illustrated by FIG. 1, network node 200 is represented by radio controller 34. In alternative embodiments, network node 200 may represent elements of one or more base stations 32. In general, however, network node 200 may represent any appropriate component or components located in or connected to access network 30.

As shown in FIG. 5, the illustrated embodiment of network node 200 includes a processor 510, a memory 520, and a transceiver 530. Processor 510 and memory 520 may represent identical or analogous elements to the similarly-named elements of FIG. 5. Transceiver 530 represents any transceiver or combination of transmitter and receiver capable of communicating directly or indirectly with repeater 20. Depending on the configuration of mobile communication system 10, transceiver 530 may be capable of wireless communication (e.g., where network node 200 represents a base station or similar element of access network 30 capable of direct wireless communication with repeaters 20) or wired communication (e.g., where network node 200 represents an RNC that transmits information to and receives information from repeaters 20 indirectly through a wired connection with a base station 32). In particular embodiments of network node 200, some or all of the functionality of network node 200 described herein, including the operation described below with respect to FIG. 6, may be implemented by processor 510 executing instructions and/or operating in accordance with its hardwired logic.

Figure 6:
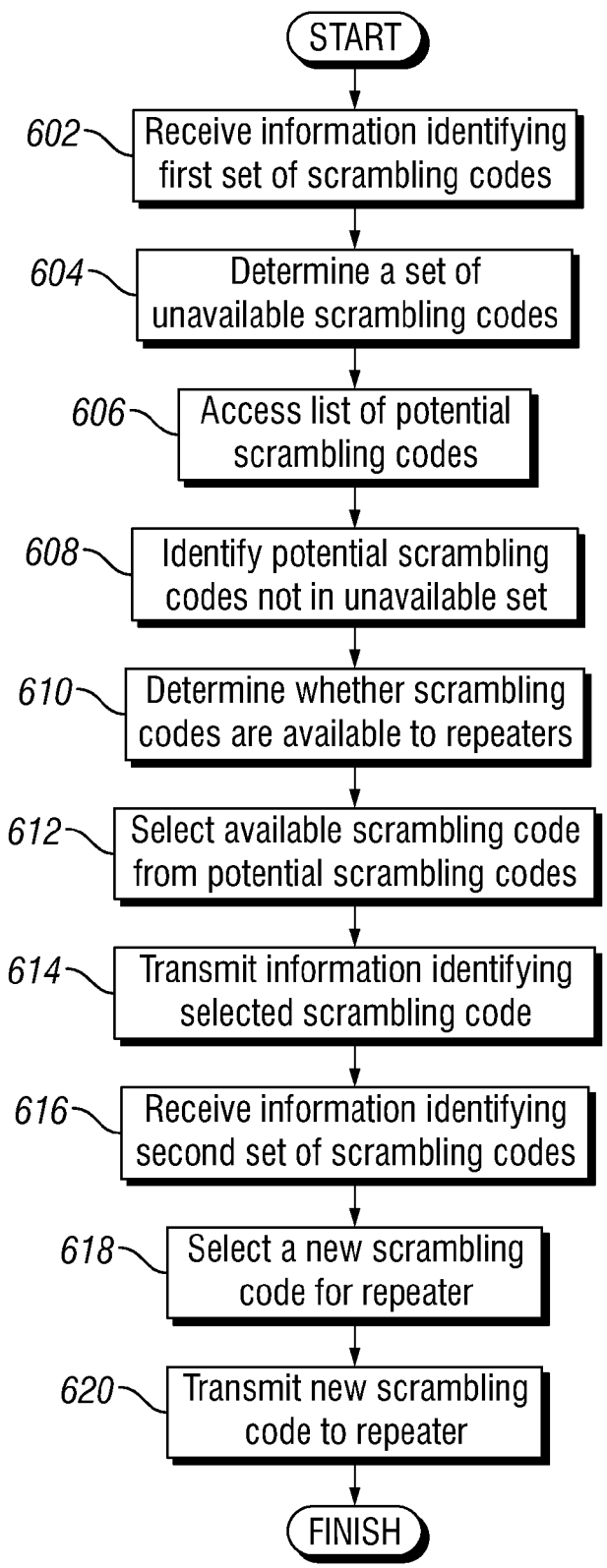
FIG. 6 is a flowchart illustrating example operation of a particular embodiment of the network node described in FIG. 5.

FIG. 6 is a flowchart detailing example operation of a particular embodiment of network node 200. In particular, FIG. 6 illustrates operation of an embodiment of network node 200 in assigning scrambling codes to a repeater 20. The steps illustrated in FIG. 6 may be combined, modified, or deleted where appropriate. Additional steps may also be added to the example operation. Furthermore, the described steps may be performed in any suitable order.

Operation of network node 200 begins at step 602 with network node 200 receiving information identifying a first set of scrambling codes from a repeater 20. This information may represent the scrambling codes themselves or other information from which network node 200 can determine the actual scrambling codes. The first set of scrambling codes includes one or more scrambling codes that are being used by base stations 32 from which the relevant repeater 20 has received signals. In particular embodiments, the first set may also include one or more scrambling codes being used by other repeaters 32 from which the relevant repeater 20 has received signals. As described above, network node 200 may also receive information from other sources on the scrambling codes being used in the vicinity of the relevant repeater 20.

At step 604, network node 200 determines a set of one or more unavailable scrambling codes based on the first set. This unavailable scrambling set includes the scrambling codes from the first set. It also may include scrambling codes that other sources have indicated are being used in the vicinity of repeater 20. Additionally, in particular embodiments, other scrambling codes may also be unavailable for use by this repeater 20 because it's a repeater, because of its location, or for various other reasons. Thus, in such embodiments, the set of unavailable scrambling codes may include additional scrambling codes as well, apart from the scrambling codes repeater 20 (or other sources) has indicated are being used in the vicinity.

Network node 200 then selects a scrambling code for repeater 20 based on the set of unavailable scrambling codes. Network node 200 may select the scrambling code in any appropriate manner based on the unavailable scrambling codes. One example of how network node 200 may perform this operation is shown by steps 606-610. Specifically, at step 606, network node 200 accesses a list of potential scrambling codes stored in memory 520. Network node 200 identifies the potential scrambling codes that are not included in the set of unavailable scrambling codes at step 608. In particular embodiments, only certain scrambling codes are available for use by repeaters 20, so selection of a scrambling code may involve, at some point during the selection process, determining whether one or more scrambling codes comprise a code that is available for use by repeaters 20. This is represented by step 610 of FIG. 6. In the illustrated example, network node 200 then selects a scrambling code from among the potential scrambling codes that are available for use by repeaters 20 but that are not included in the set of unavailable scrambling codes at step 612. Network node 200 may select one of relevant scrambling codes from this group at random or according to specific rules or policies. At step 614, network node 200 then transmits information identifying the selected scrambling code to repeater 20.

In particular embodiments, network node 200 may subsequently re-evaluate the initial scrambling code assignment or perform another scrambling code assignment for repeater 20 at a later time instant. An example of this process is illustrated by steps 616-620 in FIG. 6. At step 616, network node 200 receives information identifying a second set of scrambling codes that differs from the first set of scrambling codes. As one example, network node 200 may receive an updated list of scrambling codes currently being detected by repeater 20. As another example, network node 200 may receive information identifying scrambling codes detected by a mobile device that has also detected repeater 20.

If network node 200 determines that the selected scrambling code is included in the second set of scrambling codes, network node 200 may respond to this determination by assigning a new scrambling code to repeater 20. Thus, at step 618, network node 200 selects a new scrambling code for repeater 20 based on the second set of scrambling codes. Depending on its configuration, network node 200 may select this new scrambling code in a similar fashion to or in a different manner from that described above for the originally-assigned scrambling code. After selecting this new scrambling code, network node 200 transmits information identifying the new scrambling code to repeater 20 at step 620.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of configuring a repeater in a mobile communication network, comprising:

receiving information identifying a first set of scrambling codes from a repeater, wherein the first set of scrambling codes comprises one or more scrambling codes that are being used by base stations from which the repeater has received signals;

determining a set of one or more unavailable scrambling codes based on the first set;

selecting a scrambling code for the repeater based on the set of unavailable scrambling codes; and transmitting information identifying the selected scrambling code to the repeater.

2. The method of claim 1, wherein the repeater comprises a first repeater, and the first set further comprises one or more scrambling codes that are being used by other repeaters from which the first repeater has received signals.

3. The method of claim 1, wherein the method further comprises receiving information identifying a second set of one or more scrambling codes from a mobile terminal that has received signals transmitted by the repeater, wherein the second set of scrambling codes comprises one or more scrambling codes used by base stations in communication with the mobile terminal, and wherein determining the set of unavailable scrambling codes comprises determining a set of one or more unavailable scrambling codes based on the first set and the second set.

4. The method of claim 1, wherein determining the set of unused scrambling codes comprises:

accessing a list of potential scrambling codes stored in memory; and identifying the potential scrambling codes that are not included in the set of unavailable scrambling codes.

5. The method of claim 4, wherein determining the set of unused scrambling codes further comprises determining whether one or more of the potential scrambling codes is available for use by repeaters.

6. The method of claim 1, further comprising:

after transmitting information identifying the selected scrambling code to the repeater, receiving information identifying a second set of scrambling codes from the repeater, wherein the second set of scrambling codes comprises one or more scrambling codes used by base stations in communication with the mobile terminal;

determining that the selected scrambling code is included in the second set of scrambling codes;

in response to determining that the selected scrambling code is included in the second set of scrambling codes, selecting a new scrambling code for the repeater based on the first set of scrambling codes and the second set of scrambling codes; and transmitting information identifying the new scrambling code to the repeater.

7. The method of claim 1, wherein receiving information identifying the first set of scrambling codes from the repeater comprises receiving information identifying scrambling codes used by a predetermined number of base stations from which the repeater is receiving strongest signals.

8. The method of claim 7, wherein transmitting information identifying the first set of scrambling codes comprises:

determining a first set of scrambling codes, wherein the first set of scrambling codes comprises scrambling codes used by base stations from which the repeater is receiving a predetermined number of strongest signals; and transmitting information identifying the determined set of scrambling codes.

9. An apparatus for use as a base station in a mobile communication network, the apparatus comprising:

a transmitter operable to transmit signals wirelessly;

a receiver operable to receive wireless signals; and one or more processors, the processors collectively configured to:

receive information identifying a first set of scrambling codes from a repeater using the receiver, wherein the first set of scrambling codes comprises one or more scrambling codes that are being used by base stations from which the repeater has received signals;

determine a set of one or more unavailable scrambling codes based on the first set;

select a scrambling code for the repeater based on the set of unavailable scrambling codes; and transmit information identifying the selected scrambling code to the repeater using the transmitter.

10. The apparatus of claim 9, wherein the repeater comprises a first repeater, and the first set further comprises one or more scrambling codes that are being used by other repeaters from which the first repeater has received signals.

11. The apparatus of claim 9, wherein:

the one or more processors are further operable to receive information identifying a second set of scrambling codes from a mobile terminal that has received signals transmitted by the repeater, wherein the second set of scrambling codes comprises one or more scrambling codes used by base stations in communication with the mobile terminal, and the one or more processors are operable to determine the set of unavailable scrambling codes by determining a set of one or more unavailable scrambling codes based on the first set and the second set.

12. The apparatus of claim 9, wherein the one or more processors are operable to determine the set of unused scrambling codes by:

accessing a list of potential scrambling codes stored in memory; and identifying the potential scrambling codes that are not included in the set of unavailable scrambling codes.

13. The apparatus of claim 12, wherein the one or more processors are further operable to determine whether one or more of the potential scrambling codes is available for use by repeaters.

14. The apparatus of claim 9, wherein the one or more processors are further operable to:

receive information identifying a second set of scrambling codes after transmitting information identifying the selected scrambling code to the repeater, wherein the second set differs from the first set;

determine that the selected scrambling code is included in the second set of scrambling codes;

in response to determining that the selected scrambling code is included in the second set of scrambling codes, select a new scrambling code for the repeater based on the second set of scrambling codes; and transmit information identifying the new scrambling code to the repeater.

15. The apparatus of claim 9, wherein the one or more processors are operable to receive information identifying the first set of scrambling codes from the repeater by receiving information identifying scrambling codes used by a predetermined number of base stations from which the repeater is receiving strongest signals.

* * * * *

UNITED STATES PATENT AND TRADEMARK OFFICE
CERTIFICATE OF CORRECTION

PATENT NO. : 8,805,271 B2
APPLICATION NO. : 13/238509
DATED : August 12, 2014
INVENTOR(S) : Gunnarsson et al.

It is certified that error appears in the above-identified patent and that said Letters Patent is hereby corrected as shown below:

References Cited

On Page 2, in Item (56), under "OTHER PUBLICATIONS", in Column 1, Line 1, delete "Project:" and insert -- Project; --, therefor.

In the specification

In Column 8, Line 39, delete "with," and insert -- with --, therefor.

In Column 9, Line 18, delete "Of" and insert -- of --, therefor.

Signed and Sealed this
Third Day of November, 2015

Michelle K. Lee
*Director of the United States Patent and Trademark Office*